United States Patent [19]

Martin

[11] 4,420,132

[45] Dec. 13, 1983

[54] SECURING DEVICE FOR HELICOPTERS AND THE LIKE

[76] Inventor: Gerald J. Martin, 49 Thorncliffe Park Dr., Apt. 908, Toronto, Ontario, Canada, M4H 1J6

[21] Appl. No.: 273,153

[22] Filed: Jun. 12, 1981

[51] Int. Cl.³ .............................................. B64F 1/22
[52] U.S. Cl. ................................. 244/115; 244/17.17
[58] Field of Search ...................... 244/115, 116, 17.17, 244/161; 114/261; 269/25, 33, 238, 239

[56] References Cited

U.S. PATENT DOCUMENTS

| | | | |
|---|---|---|---|
| 3,303,807 | 2/1967 | Stewart et al. | 244/115 |
| 3,552,688 | 1/1971 | Baekken | 244/115 |
| 3,552,689 | 1/1971 | Baekken | 244/115 |
| 4,123,020 | 10/1978 | Korsak | 244/116 |

Primary Examiner—Charles E. Frankfort
Attorney, Agent, or Firm—Rogers, Bereskin & Parr

[57] ABSTRACT

A device for securing helicopters and the like with respect to a support surface such as the deck of a ship has a pair of arresting beams adapted to be mounted on the support surface. The arresting beams are pivotally connected together for arcuate movement between spaced positions in which they define a sector-shaped target area and co-operating positions in which the beams close onto a probe depending from a helicopter to be secured. Hydraulic cylinder and ram devices are provided for moving the beams. The beams can be locked with respect to one another by, for example, a catch and keeper assembly. They can also be locked angularly with respect to a pivot axis of the arresting beams.

10 Claims, 10 Drawing Figures

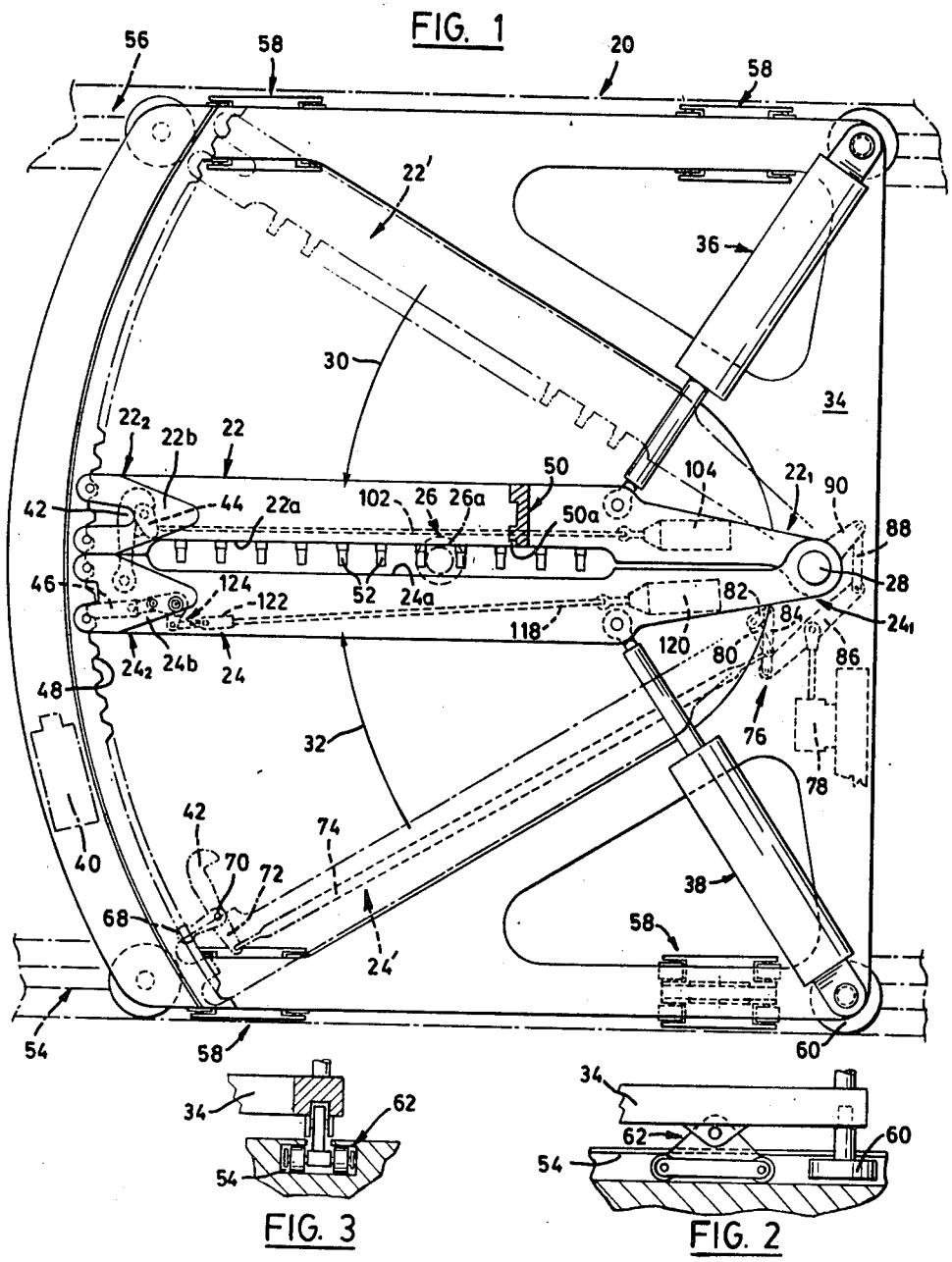

1

SECURING DEVICE FOR HELICOPTERS AND THE LIKE

This invention relates to a device for securing helicopters and the like with respect to a support surface such as the deck of a ship.

Landing a helicopter on the deck of a ship at sea is a hazardous operation, and it has previously been proposed to provide a securing device on the deck by which a helicopter can be "trapped" immediately upon touchdown. U.S. Pat. Nos. 3,552,688 and 3,552,689 (Baekken) both disclose a device of this type which is known as the "Beartrap". This type of securing device is designed to lock onto a probe which depends from the underside of the helicopter. Typically, the helicopter is hauled down onto the deck against the lift generated by its rotors until the probe can be engaged by the securing device. This is accomplished by first lowering a cable from the helicopter as it hovers over the securing device. The cable has a fitting at its lower end (referred to as a "messenger probe"), to which a haul-down cable is manually connected when the fitting reaches the deck; the fitting is then hoisted back up into the helicopter where the haul-down cable is locked inside a fixed probe which projects down below the helicopter. When the helicopter touches down, the securing device locks onto the probe but the pilot may elect to break free at any time before securing by releasing the haul-down cable and lifting off.

The securing device disclosed in the two U.S. patents referred to above essentially includes two parallel arresting beams which are moved towards one another (while remaining parallel) by hydraulic cylinder and ram devices connected to the beams by a complex cable and chain transmission system. While this type of securing device has been found to be satisfactory in principle, various practical difficulties may arise. For example, loss of beam parallelism due to cable stretch, fraying, etc. may prevent proper engagement with the helicopter probe. Also, the device is relatively complex and includes many moving parts which will be susceptible to wear and/or failure in practice. An advantage of the "Beartrap" securing device is that it presents a relatively large rectangular "target" area between the beams within which the helicopter probe can be trapped. On the other hand, in practical tests, it was found that satisfactory probe engagement could be consistently achieved within a circle of three feet in diameter even under the worst ship motion conditions.

An object of the present invention is to provide a securing device intended to avoid the disadvantages of the Beartrap device and which is of simpler construction.

According to the invention, the device includes a pair of arresting beams having first and second ends and adapted to co-operate to trap therebetween a probe depending from a helicopter and the like to be secured with respect to a support surface. The beams are pivotally supported at their first ends for movement about a common pivot axis between spaced apart positions in which the beams define therebetween a target area having the general shape of a sector of a circle for receiving a said probe, and positions in which the beams have moved inwardly into co-operating positions for trapping the probe. The pivotal supporting means for the beams is adapted to be mounted to said surface so that the helicopter and the like is secured with respect to the surface when its probe is trapped by the beams. The device also includes fluid pressure operated actuating means coupled to the beams and operable to move the beams between their spaced apart positions and their co-operating positions. The actuating means is capable of causing the beams to co-operate and trap a probe anywhere within the target area. Means is also provided for locking the beams both with respect to one another and angularly about the pivot axis after the beams have moved into their co-operating positions and trapped a probe therebetween.

In order that the invention may be more clearly understood, reference will now be made to the accompanying drawings which illustrate a number of preferred embodiments of the invention by way of example, and in which:

FIG. 1 is a plan view of a securing device according to a first embodiment of the invention;

FIGS. 2 and 3 are detail views of parts of the device shown in FIG. 1;

FIG. 6 is a view in the direction of arrow A in FIG. 4;

FIG. 7 is a diagrammatic plan view of the device shown in FIG. 1 and illustrates the further feature of the device;

FIG. 8 is a plan of a securing device according to a second embodiment of the invention;

FIG. 9 is a sectional view on line IX—IX of FIG. 8; and,

FIG. 10 is a partial plan view of a securing device according to a further embodiment of the invention.

Figure 4:
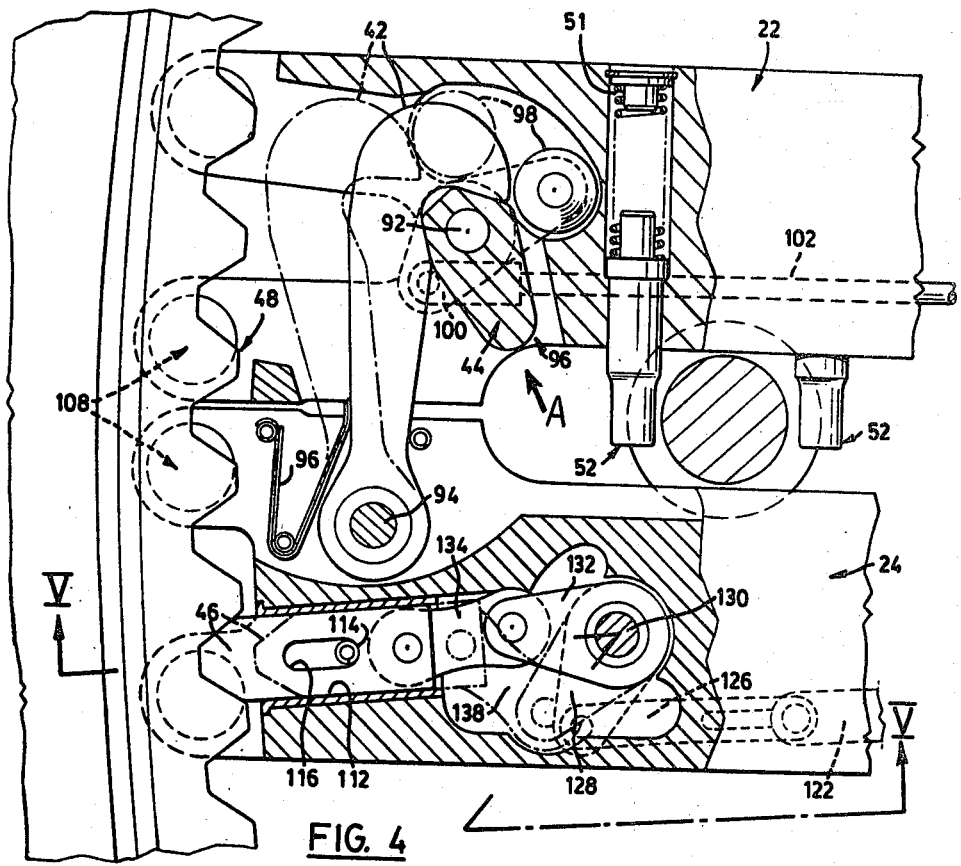
FIG. 4 is an enlarged detail view of a different part of FIG. 1.

Reference will first be made to the embodiment of the invention illustrated in FIGS. 1 to 7. These views show a securing device which is designed to be movable along a ship's deck by means of a winch so that the device can also be used to move the helicopter once it has landed (for example, into a hanger). By way of contrast, FIGS. 8 and 9 of the drawings show a static device which would be secured in a fixed position on a ship's deck.

Referring first to FIG. 1, the device is generally indicated at 20 and includes two arresting beams denoted respectively 22 and 24. The beams are shown in full lines in co-operating positions such as they would occupy when trapping therebetween a probe depending from the underside of a helicopter. The outline of such a probe is indicated at 26 in FIG. 1 and the design of the beams which permit the probe to be trapped will be more particularly described later. The beams have respective first and second ends denoted $22_1$, $22_2$ and $24_1$, $24_2$ and are pivotally supported at their first ends ($22_1$ and $24_1$) for movement about a common pivot axis defined by a pivot pin 28. Thus, the beams are movable between the co-operating positions in which they are shown in full lines in FIG. 1 to spaced apart positions indicated in ghost outline and denoted respectively 22' and 24'. In these positions, the beams define therebetween a "target area" having the general shape of a sector of a circle, within which a probe can be trapped. In other words, when the securing device is "cocked" or "primed" ready to receive a probe, the beams will be in their spaced apart positions and the beams will move inwardly as indicated by the arrows 30 and 32 in FIG. 1 to their co-operating positions for trapping a probe when the helicopter in question has touched down.

It will of course be appreciated that the probe may be disposed at any position within the target area defined between the spaced apart beams and that the beams will not necessarily be disposed on the centre line of the device as shown when a probe is trapped therebetween (see later). As indicated above, in practical tests, it was determined that prior art devices could consistently trap a probe within a three foot diameter circle even under the worst ship motion conditions. Accordingly, in practice, securing devices constructed according to the present invention should preferably be dimensioned such that the target area can accommodate a three foot diameter circle. On this basis, it has been determined that the target area should define the shape of a 60° sector of 54" radius.

Pivot pin 28 projects upwardly from a frame generally denoted 34 which is mounted to the surface on which the helicopter is to land (the ship's deck) so that the helicopter is secured with respect to the surface when the probe is trapped by the beams. In other words, frame 34 is held down on the deck so that the securing device will, in turn, hold down the helicopter. This is achieved by an "undercarriage" arrangement which is received in undercut tracks in the deck of the ship as will be more particularly described later. For present purposes, it is sufficient to note that the frame 34 is retained on the deck and that pivot pin 28 has a head which prevents the arresting beams lifting vertically off the pin.

Respective hydraulic cylinder and ram devices denoted 36 and 38 are coupled between frame 34 and the beams 22 and 24 for moving the beams between their spaced apart positions and their co-operating positions. Hydraulic fluid will be supplied to the devices 36 and 38 either from a remote power unit through suitable hoses (not shown) or from a power unit mounted on the frame, for example, as indicated at 40. For convenience of illustration, hydraulic couplings, valves, pipes and the like have not been shown. However, it should be noted that the hydraulic circuit for the devices 36 and 38 includes suitable valving for permitting the beams 22 and 24 to trap a probe anywhere within the target area of the device. For example, if the probe 26 were to enter the target area directly adjacent beam 22 (in its outer position), cylinder and ram device 36 might move beam 22 only a very short distance before contacting the probe. The hydraulic circuit would be arranged so that, while beam 22 would be applied against the probe by device 36, cylinder and ram device 38 would continue to move beam 34 beyond the centre line position in which it is shown in FIG. 1 until it too contacted the probe. The co-operating positions of the two beams would then be substantially offset from the centre line of the securing device but the probe would nonetheless be trapped by the beams. The securing device as shown in FIG. 1 incorporates an arrangement for subsequently centering the beams, which arrangement will be described later.

Operation of the cylinder and ram devices 36 and 38 will normally be effected under remote manual control by an operator trained to recognize when the helicopter has properly touched down. Various other hydraulic components of the device (to be described) can then be operated by suitable sequence control equipment which will also be apparent to a person skilled in the art. In summary, the hydraulic circuitry will be entirely conventional and therefore will not be described in detail.

Returning to a consideration of FIG. 1 of the drawings, the securing device 20 also includes means adapted to lock the beams both with respect to one another and angularly about the pivot axis of pin 28 after the beams have moved to their co-operating positions and trapped probe 26. In this particular embodiment, these lock means take the form of a catch generally indicated at 42 which is mounted on beam 24 adjacent its second end $24_2$ and which is adapted to engage a keeper 44 on beam 22. The catch 42 and keeper 44 lock the two beams together as will be described later in more detail primarily with reference to FIG. 4. In addition, the lock means includes a finger 46 on beam 24 which engages with an arcuate toothed sector 48 and by which the two beams are locked angularly about pivot pin 28. Sector 48 essentially forms part of the frame 34 of the device and presents an array of inwardly directed teeth which face the second (outer) ends $22_2$ and $24_2$ of the beams 22 and 24. The curvature of sector 48 is selected to correspond to the shape of the arc described by the ends $22_2$ and $24_2$ of the beams as they pivot about pin 28. This part of the locking means will be more particularly described later primarily with reference to FIG. 5.

Referring now to the beams 22 and 24 themselves, it will be seen from FIG. 1 that the beams have respective inner edges which are recessed as indicated at 22a and 24a in the region which the probe is to be engaged. Probe 26 will normally comprise a rod-shaped portion having an enlarged head at its lower end as indicated at 26a. The beams 22 and 24 are undercut along the length of their recessed portions 22a and 24a respectively to accommodate the head of the probe. By way of example, the cross-sectional shape of beam 22 has been indicated at 50 in FIG. 1 and the undercut portion is indicated at 50a. Beam 24 is of similar shape in cross-section but of opposite hand. A plurality of pins 52 are provided on arm 22 and project outwardly therefrom into the recess defined between the two arms. The pins are spaced by an amount slightly greater than the diameter of the central rod portion of the probe 26 so that the probe will tend to locate between two adjacent pins when the arms are moved together. Also, each pin is axially slidable in arm 22 and the pins are biassed outwardly by respective compression springs, one of which is indicated at 51 in FIG. 4, so that any pins can in fact be momentarily depressed if the probe should happen to be disposed directly between the end of the pin and arm 24. As a result of the continuous motion which will be taking place between the helicopter and securing device, it is anticipated that the probe will subsequently move laterally of the depressed pin to an extent sufficient to allow the pin to return under the effect of its spring biassing.

In the securing device disclosed in the two U.S. patents referred to above, both arresting beams are provided with pins and the pins are intended to be aligned so as to fit together end to end when the beams are close together. While this arrangement may be employed with the present invention, it is believed to be unnecessary because the pins in effect form very stiff cantilevered beams and, accordingly, a pair of such pins will only share the probe loading equally if the pins are closely matched in position and fit; this has been found to be unlikely to occur in practice.

As indicated above, the two beams 22 and 24 are the same shape as one another but of opposite hand. The beams are specially shaped so that the recess portions 22a and 24a co-operate to define a recess disposed symetrically about a radius of the sector based on pin 28. Adjacent their second (outer) ends $22_2$ and $24_4$, the arms define shaped portions 22b and 24b respectively which form part of the lock means of the securing device as will be more particularly described later. Similarly shaped formations are provided at the underside of each beam but are not visible in FIG. 1.

As mentioned above, the securing device is mounted to the deck surface of the ship in question by means of an undercarriage arrangement. This arrangement is best illustrated in FIGS. 2 and 3 when viewed in conjunction with FIGS. 1 and will now be described. Referring first to FIG. 3, the deck of the ship is formed with two parallel tracks of undercut T-shape, one of which is indicated at 54 in FIG. 3. Part of that track is also indicated in FIG. 1 as is the corresponding, parallel track, denoted 56. The frame of the securing device is fitted with four bogey assemblies, each of which is generally denoted 58, and which run in the tracks 54 and 56. The bogey assemblies are disposed one adjacent each "corner" of the frame of the securing device and two of the assemblies run in each of the tracks 54 and 56. Each assembly includes a wheel 60 which rotates about a vertical axis and the peripheral edge of which locates against opposite sides of the track (see FIG. 2). In addition, each assembly includes a carriage 62 having four wheels which rotate about horizontal axes and which locate against upper and lower surfaces of the track as best seen in FIG. 3. Thus, it will be appreciated that the securing device is located both laterally and in the vertical direction at all four "corners" but can move longitudinally of the deck in the tracks 54 and 56. Typically, a winch cable will be attached to the frame 34 of the securing device so that the device, together with the "captured" helicopter can be moved along the deck of the ship by means of a winch attached to the cable. It may be convenient at this stage to refer to FIG. 7 of the drawings in describing an optional feature of the securing device designed to "centre" the arresting beams parallel to the two tracks 54 and 56 so that the helicopter will tend to orient itself parallel to the direction in which the securing device is being moved. This may be particularly useful, for example, where the helicopter is to be moved into a hanger or other specific location in which it must be properly oriented. Without this feature, if the helicopter probe has been arrested with the arresting beams 22 and 24 positioned offset from the centre line of the securing device, the helicopter will not be exactly properly oriented in the direction transverse to the direction of movement of the securing device. Of course, in some situations, this may not be critical and in fact where a static securing device is used there would be no point in providing this feature.

In FIG. 7, the securing device is generally indicated at 20 and is shown moving in the direction of arrow 64 under the control of a winch cable (not shown). Two non-structural guide profiles 66 are secured to the deck of the ship in the path of the securing device and define the general shape of a chevron oriented in the direction of movement of the securing device. The arresting beams 22 and 24 of the device are shown in an offset position such as they typically might occupy in a practical situation. Referring back to FIG. 1, beam 24 is provided with a stylus 68 which is arranged to protrude from the underside of the beam so as to impinge against the relevant one of the guide profiles 66 (FIG. 7) in the event that beam 24 is off centre. For convenience of illustration, the stylus 68 (and associated linkage) have been shown in chain dotted outline only in the outer position of beam 24, but in practice the stylus is permanently mounted on the beam and will move with it. Stylus 68 is pivoted at 70 to beam 24 and is rigidly connected to a link 72, the outer end of which is attached to a control rod 74 which runs the length of the arm and connects to a linkage 76 adjacent pivot pin 28. This linkage is used to control a four-way selector valve 78 in the hydraulic circuit of the device so that, when the valve is operated, the cylinder and ram devices 36 and 38 will be powered to swing the two beams onto the centre line of the device. When the beams reach the centre line position (or are already in that position) valve 78 will be inoperative. Linkage 76 includes a bellcrank 80 which is pivoted to arm 24 at 82 and a series of links 84, 86 and 88 arranged to define a parallelogram linkage. Link 88 is pivoted at its outer end to a lug 90 which projects from arm 24 at the opposite of pivot pin 28 to the main part of the arm. Valve 78 is pivoted to link 86 intermediate its ends. The linkage 76 is designed to maintain stylus 68 in the same orientation with respect to arm 24 irrespective of the angular position about pivot pin 28, but to permit the stylus to operate valve 78 in the event that the stylus is deflected by one of the guide profiles 66 (FIG. 7).

Figure 5:
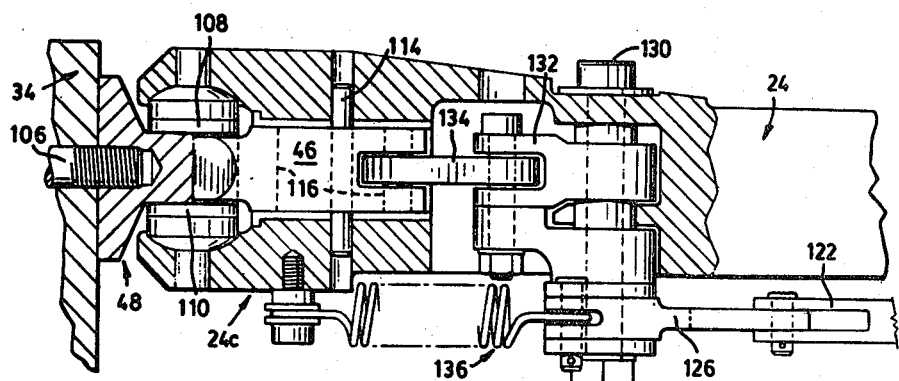
FIG. 5 is a sectional view on line V—V of FIG. 4.

Reference will now be made primarily to FIGS. 4 and 5 in describing the lock means of the securing device. FIG. 4 is an enlarged detail view of the second (outer) end portions $22_2$ and $24_2$ of the two arresting beams as shown locked together. The beams are held together by the catch 42 and keeper 44 referred to above. Catch 42 is carried by beam 24 while keeper 44 is carried by beam 22. The catch and keeper are located in recesses formed in the respective beams. Keeper 44 is fixed to a pivot pin 92 in the associated recesses in beam 22 while catch 42 is pivotally mounted in its recess on a fixed pin 94 so as to project laterally from beam 24 towards beam 22.

In FIG. 4, catch 42 is shown in full lines in its engaged position with keeper 44 and in chain-dotted outline in a disengaged position. Catch 42 can be moved to this position by a release lever generally denoted 96 mounted to pivot on the pin 92 which carries the keeper 44. Lever 96 is mounted intermediate its ends on pin 92 and has a roller 98 at one end and, at its opposite, a clevis 100 attached to an actuating rod 102. Roller 98 is arranged to bear against the leading end portion of catch 42 when the catch is in its engaged position as shown in full lines in FIG. 4 and to be movable to the position indicated in ghost outline in response to movement of the actuating rod 102 to the right as shown in FIG. 4. Movement of roller 98 in this direction causes the catch 42 to be forced off keeper 44 towards its disengaged position so that the beams 22 and 24 are then released from one another.

Referring back to FIG. 1, the actuating rod 102 is shown in dotted lines in that view and it will be seen that the rod extends longitudinally of beam 22 from the position of keeper 44 (roller 98 is not shown) to a hydraulic actuator 104 disposed adjacent the first (inner) end of beam 22. The actuator is coupled in the hydraulic circuit of the securing device and is arranged to cause axial movement of rod 102 to the right as shown in FIG. 1, causing roller 98 to disengage the catch 42 as described above. Actuator 104 will normally be operated under manual control to release the helicopter probe when the machine has been otherwise secured on the ship, or on takeoff of the helicopter.

FIG. 4 also shows the locking finger 46 used for securing the beams angularly about the pivot axis defined by pivot pin 28. This finger is also shown in FIG. 5. It will also be seen from that view sector 48 is an intially separate part secured to part of the frame 34 of the securing device by screws, one of which is indicated at 106. The formation 24b at the second (outer) end 24₂ of beam 24 is also visible in FIG. 5 as is the companion formation (denoted 24c) at the underside of the beam. It will be seen that these formations in effect embrace the toothed sector 48 from above and below respectively. Slipper plates 108 and 110 are provided in the respective formations 24b and 24c and engage respectively on upper and lower faces of the teeth of sector 48. It will be seen from FIGS. 1 and 4 that the formations 24b and 24c are in fact bifurcated and that each formation is provided with two such slipper plates. In any event, these plates slide on the teeth of sector 48 as the beams move angularly about the axis of pivot pin 28. They serve to locate the beams in the vertical direction with respect to the teeth of sector 48.

It will be seen from FIG. 4 that the locking finger 46 is longitudinally slidable in a slideway 112 formed in the outer end portion of beam 24 and oriented so that the finger extends generally radially with respect to the arcuate sector 48. The finger is retained in the slideway by a split pin 114 which extends through a slot 116 in the finger having an axial length just sufficient to allow the finger to move between the position in which it is shown in full lines in FIG. 4 in which is fully engaged with one of the teeth of sector 48, and the retracted position shown in ghost outline in that view.

Movement of the locking finger 46 between its advanced and retracted positions is derived from an actuator rod 118 which extends longitudinally of beam 24 (see FIG. 1) in similar fashion to the actuator rod 102 discussed above. Rod 118 is coupled at one end to a hydraulic actuator similar to actuator 104 and located adjacent the first (inner) end of beam 24. At its opposite end, rod 118 is coupled by means of a clevis 122 to a linkage 124 coupled to finger 46. Referring back to FIGS. 4 and 5, part of that clevis is visible in those views at 122 as is the linkage 124. Thus, it will be seen that clevis 122 is connected by an intermediate link 126 to a lug 128 which projects normally from a pivot shaft 130. A second, similar lug 132 extends generally forwardly from shaft 130 as seen in FIG. 4 and is coupled to the finger 46 by a pivoted link 134. A tension spring 136 (FIG. 5) biasses the locking finger towards its engaged position. When actuator 120 is operated, rod 118 moves to the right in FIG. 1, causing the clevis 122 (FIGS. 4 and 5) to turn pivot pin 130 in the counter-clockwise direction in FIG. 4. This moves downwardly the inner end of link 134 as indicated by arrow 138, retracting the locking finger 46.

Locking finger actuator 120 (FIG. 1) may be operated under manual control in like fashion to actuator 104. Preferably, however, actuator 120 is coupled in the hydraulic circuit (not shown) of the securing device so as to be operated automatically when the centering valve 78 is operated. Thus, the hydraulic circuit is preferably designed so that actuator 120 will retract the locking finger 46 when valve 78 is operated, so that the beams 22 and 24 can be centered, and will allow the locking finger to return to its engaged position under the influence of tension spring 136 when valve 78 is no longer operated.

Reference will now be made to FIGS. 8 and 9 in describing a securing device according to a second embodiment of the invention. In FIGS. 8 and 9, reference numerals have been used which correspond to the numerals used in FIGS. 1 to 7, but prefixed by the numeral "2". The securing device as shown in FIGS. 8 and 9 differs from that shown in the previous views primarily in that it is intended as a static securing device which will be installed in a fixed position on the deck of a ship. Accordingly, there is no frame corresponding to frame 34 but the various components of the device are individually mounted on the deck. Thus, the two beams 222 and 224 are essentially similar to the beams 22 and 24 of FIG. 1 and are mounted on a pivot pin 228, but the pin is carried directly by a base plate, denoted 299, which is bolted directly to the deck by bolts 231. Similarly, the hydraulic cylinder and ram devices 236 and 238 are provided with base plates 237 and 239 respectively which are bolted to the deck. The toothed sector 248 is fastened by bolts (not shown) to an arcuate shaped supporting bracket 249 which is bolted to the deck by bolts, some of which are indicated at 251. It will of course be appreciated that the bracket 249 will have to be appropriately oriented with respect to the paths of movement of the outer ends of the beams 222 and 224 in order to ensure proper engagement between the locking means on beam 224 and the sector 248.

Apart from the differences enumerated above, other details of the device as shown in FIGS. 8 and 9 will be similar to the device in the preceding figures. Of course, the centering stylus 68 and associated mechanism will be omitted because the device will be immobile.

FIG. 10 illustrates a further embodiment of the invention. In this case, reference numeral prefixed by the number "3" have been used to denote parts which correspond with parts shown in FIGS. 1 to 7.

The securing device as shown in FIG. 10 may either be a movable device or a static device; the primary difference as compared with the previous embodiments is that a single cylinder and ram device is used to operate both beams instead of the individual devices 36, 38 and 236, 238. This device is indicated at 300 in FIG. 10 and extends between integral extensions 322a and 324a of the respective beams 322 and 324. These extensions are arranged in a crossed configuration at the side of pivot pin 328 remote from the main portions of the beams themselves so that extension of the ram of device 300 will force the extensions apart and cause the beams to move apart, and, conversely, retraction of the ram of this device will cause the beams to move together for trapping a helicopter probe. This embodiment of the invention has the advantage of cost reduction in that only a single cylinder and ram device is required, but on the other hand, the single device cannot be used for automatically centering the arms as in the embodiment of FIGS. 1 to 7.

It will of course be appreciated that the preceding description relates to specific embodiments of the invention and that many modifications are possible within the broad scope of the claims. For example, although reference has been made to hydraulic cylinder and ram devices, pneumatic devices could of course be used; in fact, any fluid pressure operated actuating means are feasible within the broad scope of the invention. Constructional details may of course vary such, for example, as the form of the undercarriage used in the embodiment of FIGS. 1 to 7.

It should also be noted that the securing device provided by the invention is not limited in its application to the securing of helicopters. Thus, the term "device for securing helicopters and the like" is to be interpreted as including the securing of any suitably adapted object to a support surface by any means involving vertical descent. For example, the device might well be used for aircraft other than helicopters which can descend vertically or, in another context, in association with "replenishment-at-sea-transfer systems".

I claim:

1. A device for securing helicopters and the like with respect to a support surface, the device comprising:

a pair of arresting beams which have first and second ends and which are adapted to co-operate to trap therebetween a probe depending form a helicopter and the like;

means pivotally supporting said beams adjacent their said first ends for movement about a common pivot axis between spaced apart positions in which the beams define therebetween a target area having the general shape of a sector of a circle for receiving a said probe, and positions in which the beams have moved inwardly into co-operating positions for trapping said probe, said pivotal supporting means being adapted to be mounted to said surface so that the helicopter and the like is secured with respect to said surface when the probe is trapped by said beams;

fluid pressure operated actuating means coupled to said beams and operable to move the beams between said spaced apart positions and said co-operating positions, said actuating means being adapted to cause the beams to trap a said probe anywhere within said target area; and, means adapted to lock the beams both with respect to one another and angularly about said pivot axis after the beams have moved to their co-operating position and trapped a said probe.

2. A device as claimed in claim 1, which is adapted to be moved with respect to said surface to permit a helicopter and the like secured by said device to be moved on said surface, wherein said pivotal supporting means includes an undercarriage adapted to be received in at least one undercut track in said support surface so that said device is restrained against movement away from said surface and is guided in said track.

3. A device as claimed in claim 1, wherein said fluid pressure operated actuating means comprise a single hydraulic cylinder and ram unit coupled between said arresting beams.

4. A device as claimed in claim 1, wherein said means adapted to lock the beams comprise a co-operating catch and keeper associated one with each of said arresting beams and adapted to co-operate to lock the beams together around a probe, and means for retaining the locked beams against arcuate movement about said pivot axis.

5. A device as claimed in claim 4, wherein said retaining means comprises an arcuate toothed sector disposed in a position adjacent the path described by said second ends of the beams in moving between their said positions, and a locking mechanism carried by one of said beams and engagable with said sector to retain the locked beams angularly with respect to said pivot axis.

6. A device as claimed in claim 5 including automatic centering means for centering the beams with respect to said target area, wherein said fluid pressure operated actuating means comprises individual hydraulic cylinder and ram units coupled one to each of said arresting beams, and wherein said automatic centering means comprises control valve means through which hydraulic fluid is delivered to said fluid pressure actuating means in use, and follower means carried by one of said beams and positioned to co-operate with at least one guide profile secured to said surface, said follower means being coupled to and adapted to operate said control valve means, and said control valve means being adapted to equalize the pressure of hydraulic fluid delivered to said cylinder and ram units in response to deflection of said follower means by said guide profile so as to centre the beams with respect to said target area, and wherein said locking mechanism is adapted to be disengaged from said toothed sector during such centering movement of the beams and to be subsequently reengageable with said sector.

7. A device as claimed in claim 5, wherein said arcuate toothed sector is provided with respective upper and lower guide surfaces, and wherein said beams are adapted adjacent said second ends to co-operate with said guide surfaces for vertically centering said beam ends with respect to said toothed sector.

8. A device as claimed in claim 5, adapted for static mounting on a said support surface, wherein said means pivotally supporting the beams and said arcuate toothed sector are separate from one another and are adapted to be individually secured to said surface in appropriate relative orientation with said sector disposed adjacent the paths described by said second ends of the beams in moving between their respective positions.

9. A device as claimed in claim 1, wherein said beams have respective inner edge portions adapted to co-operate with one another for trapping a probe, said edge portions being recessed to receive said probe, and wherein one of said beams is provided in the region of said recess with a plurality of pins which project towards the other said beam, said pins being arranged in spaced positions corresponding generally to the diameter of a said probe to be trapped by said beams, and wherein each said pin is mounted for axial sliding movement with respect to said beam and is spring-biassed outwardly so that any pin can be depressed against said spring-biassing in the event that a probe is trapped between the end of said pin and the other beam.

10. A device as claimed in claim 1, which includes a frame and a hydraulic power unit carried by the frame, wherein said pivotal support means is mounted on the frame, and the second ends of the arresting beams slidably engage the frame, and wherein the fluid pressure operated actuating means comprises at least one hydraulic cylinder and ram unit.

* * * * *